(12) United States Patent
Kupsh et al.

(10) Patent No.: US 8,260,334 B2
(45) Date of Patent: *Sep. 4, 2012

(54) MMS BREW MESSAGE DELIVERY HYBRIDIZATION ARCHITECTURE

(75) Inventors: Jerry Kupsh, Concord, CA (US); Biren Patel, Fremont, CA (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/275,038

(22) Filed: Oct. 17, 2011

(65) Prior Publication Data

US 2012/0034903 A1 Feb. 9, 2012

Related U.S. Application Data

(63) Continuation of application No. 11/802,300, filed on May 22, 2007, now Pat. No. 8,068,861.

(51) Int. Cl.
H04W 4/00 (2009.01)

(52) U.S. Cl. .................. 455/466; 370/496; 370/522

(58) Field of Classification Search ............... 455/466, 455/412.1, 412.2, 414.1–414.4, 426.1, 2, 455/426.2, 432.1, 550.1, 552.1, 553.1, 556.1, 455/556.2, 557, 560, 561; 370/349, 496, 370/522, 310.2, 328, 338, 352–356
See application file for complete search history.

(56) References Cited

U.S. PATENT DOCUMENTS

| | | | |
|---|---|---|---|
| 7,401,065 B2* | 7/2008 | Watanabe et al. ............... | 1/1 |
| 2003/0096625 A1* | 5/2003 | Lee et al. ........................ | 455/466 |
| 2003/0139193 A1* | 7/2003 | Buckley ........................... | 455/466 |
| 2003/0193967 A1* | 10/2003 | Fenton et al. .................... | 370/490 |
| 2006/0116138 A1* | 6/2006 | Simsek et al. ................... | 455/466 |
| 2006/0253453 A1* | 11/2006 | Chmaytelli et al. ............. | 707/10 |

OTHER PUBLICATIONS

U.S. Appl. No. 10/610,566, filed Jul. 2, 2003, Clare et al.
U.S. Appl. No. 11/408,939, filed Apr. 24, 2006, Chen et al.
U.S. Appl. No. 11/233,185, filed Sep. 23, 2005, Lau et al.
Entire Prosecution of U.S. Appl. No. 11/802,300, to Jerry Kupsh et al., filed May 22, 2007, entitled, "MMS Brew Message Delivery Hybridization Architecture."
"The Binary Runtime Environment for Wireless™ . . . BREW™ platform", 2003, Verizon Wireless, retrieve from URL: http://www.vzwdevelopers.com/aims/public/BrewLanding.jsp.
"Principles of the Open Mobile Alliance", 2004, Open Mobile Alliance, Ltd. Retrieve from URL: http://www.openmobilealliance.org.
"Open Mobile Alliance Overview", 2002 Open Mobile Alliance, Ltd. Retrieve from URL: http://www.openmobilealliance.org.
"Open Mobile Alliance Digital Rights Management Short Paper", 2003 Open Mobile Alliance, Ltd. Retrieve from URL: http://www.openmobilealliance.org.
"Open Mobile Alliance Release Program—OMA Enabler Releases", 2006 Open Mobile Alliance, Ltd. Retrieve from URL: http://www.openmobilealliance.org.

\* cited by examiner

*Primary Examiner* — Jinsong Hu
*Assistant Examiner* — San Htun

(57) ABSTRACT

Techniques and equipment are provided to allow Multimedia Message Service (MMS) communication between applications on a platform on a mobile station and third party websites or web servers by using a hybridized architectural design of MMS and BREW services. The following communications are provided: communication from a BREW application on a first mobile station to a BREW application on a second mobile station, communication from a BREW application on a mobile station to an application server or website, and communication from an application server or website to a BREW application on a mobile station.

10 Claims, 5 Drawing Sheets

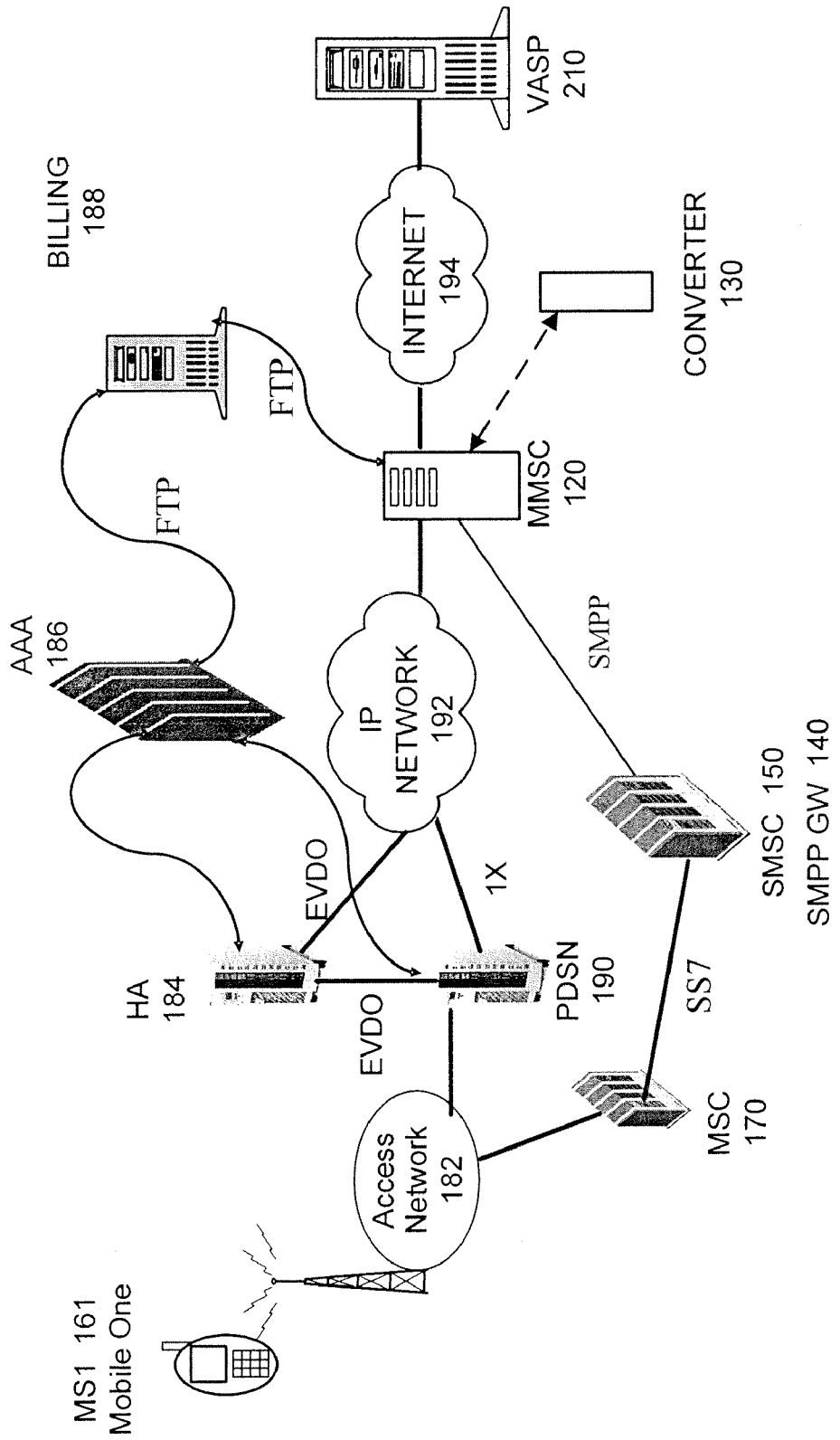
FIG. 1 CONVERTER AND REFERENCE ARCHITECTURE

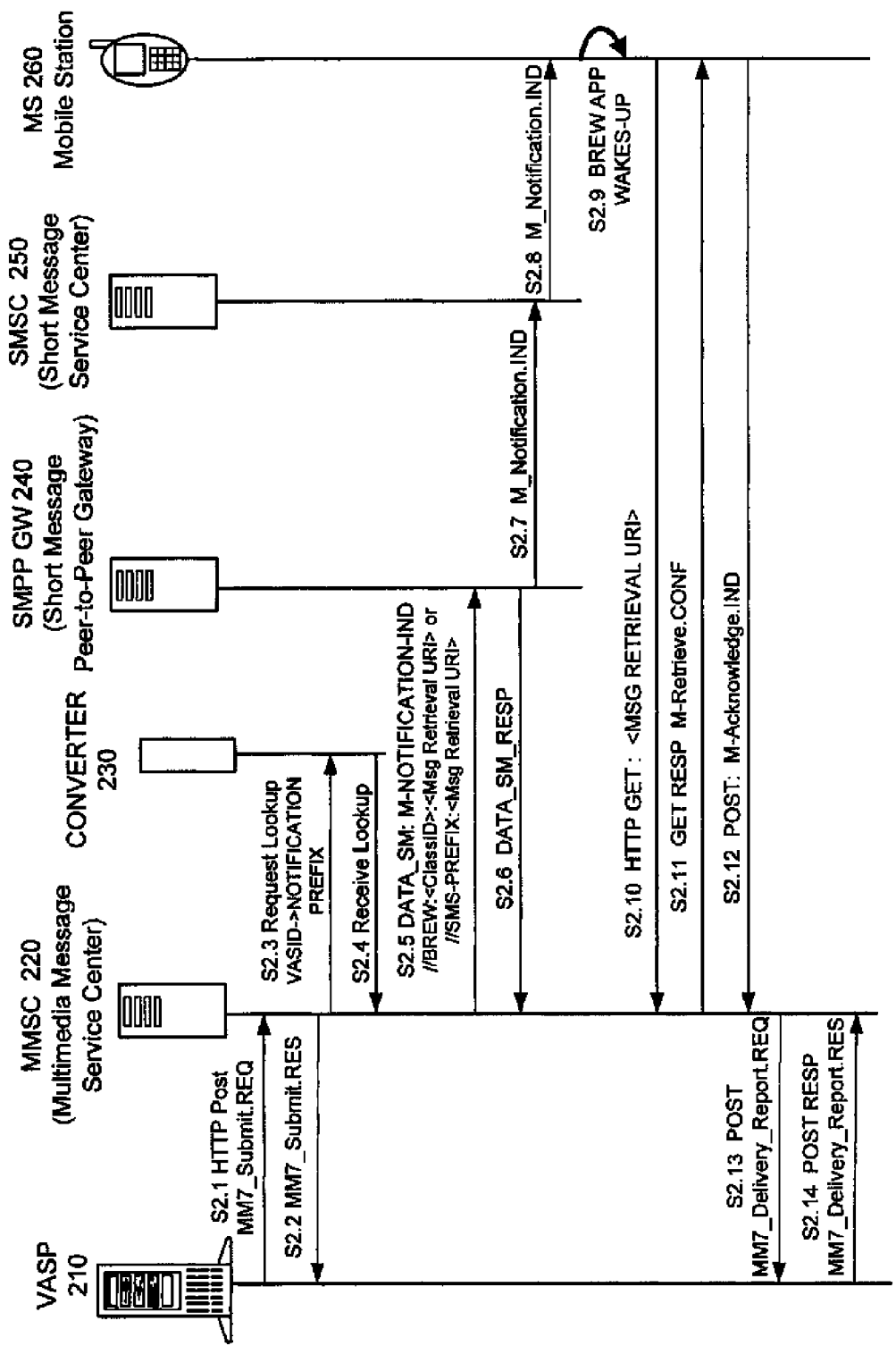
FIG. 2 VASP to MS call flow

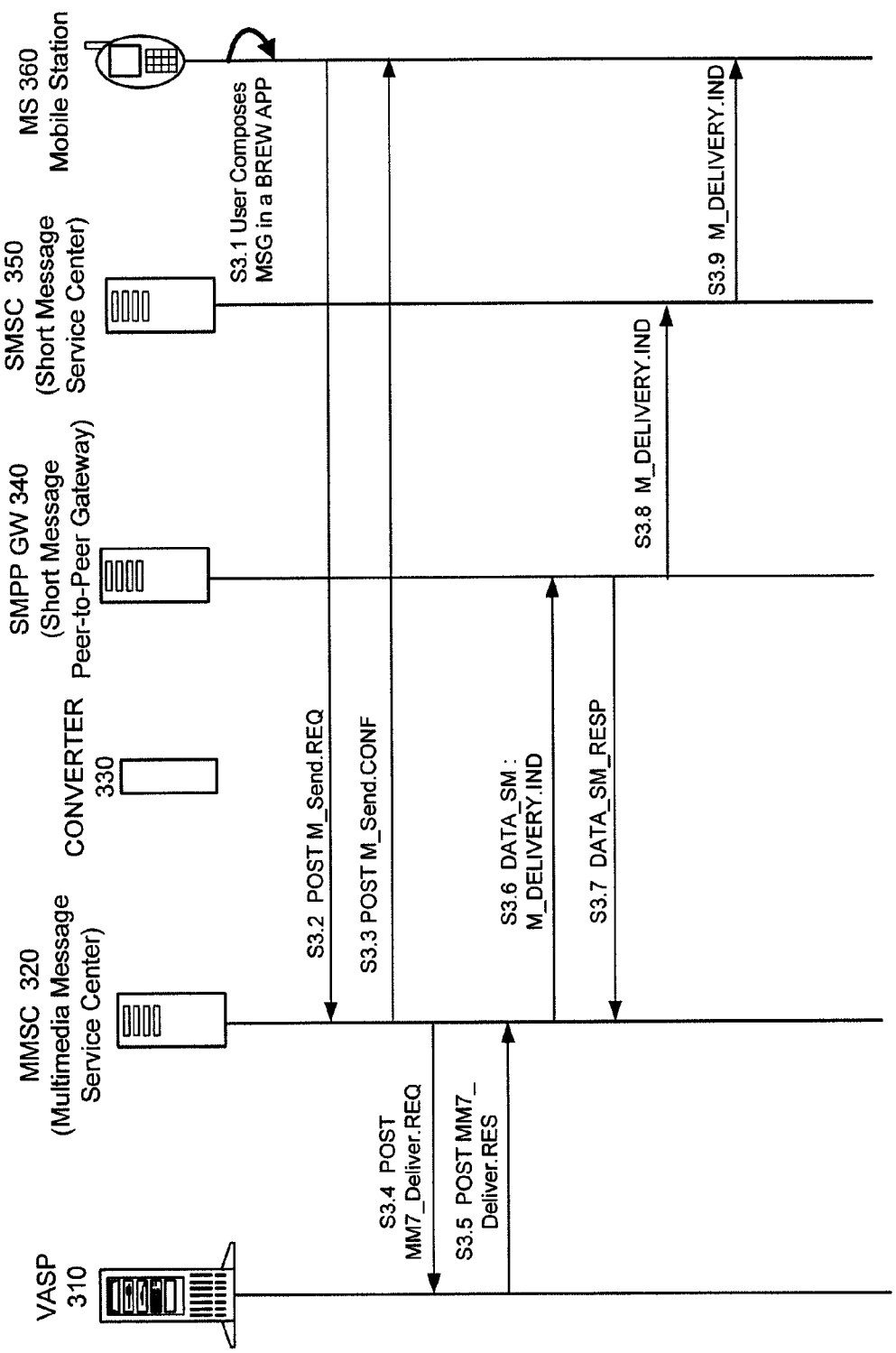
FIG. 3 MS to VASP call flow

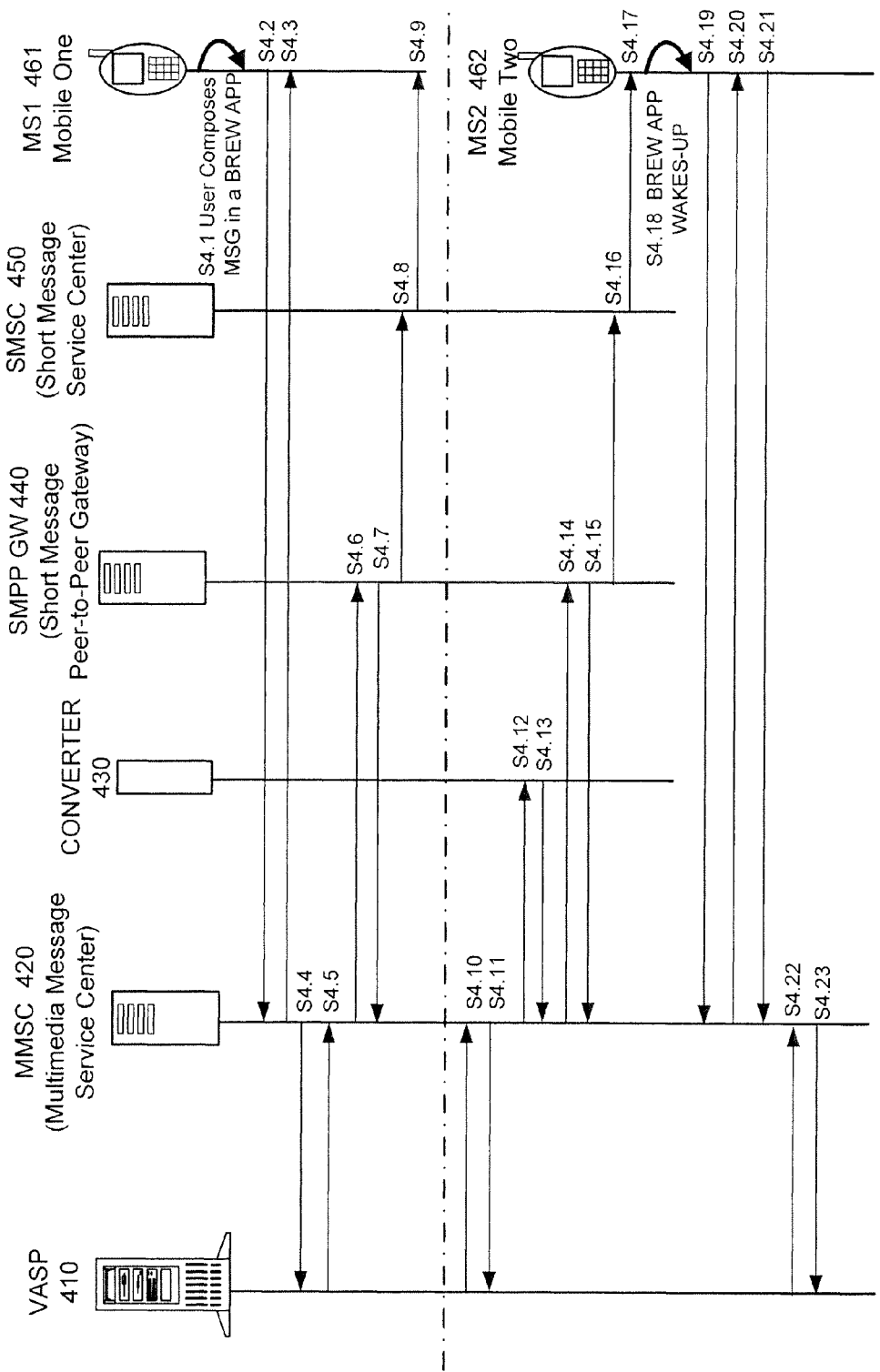
FIG. 4 MS1 to MS2 call flow

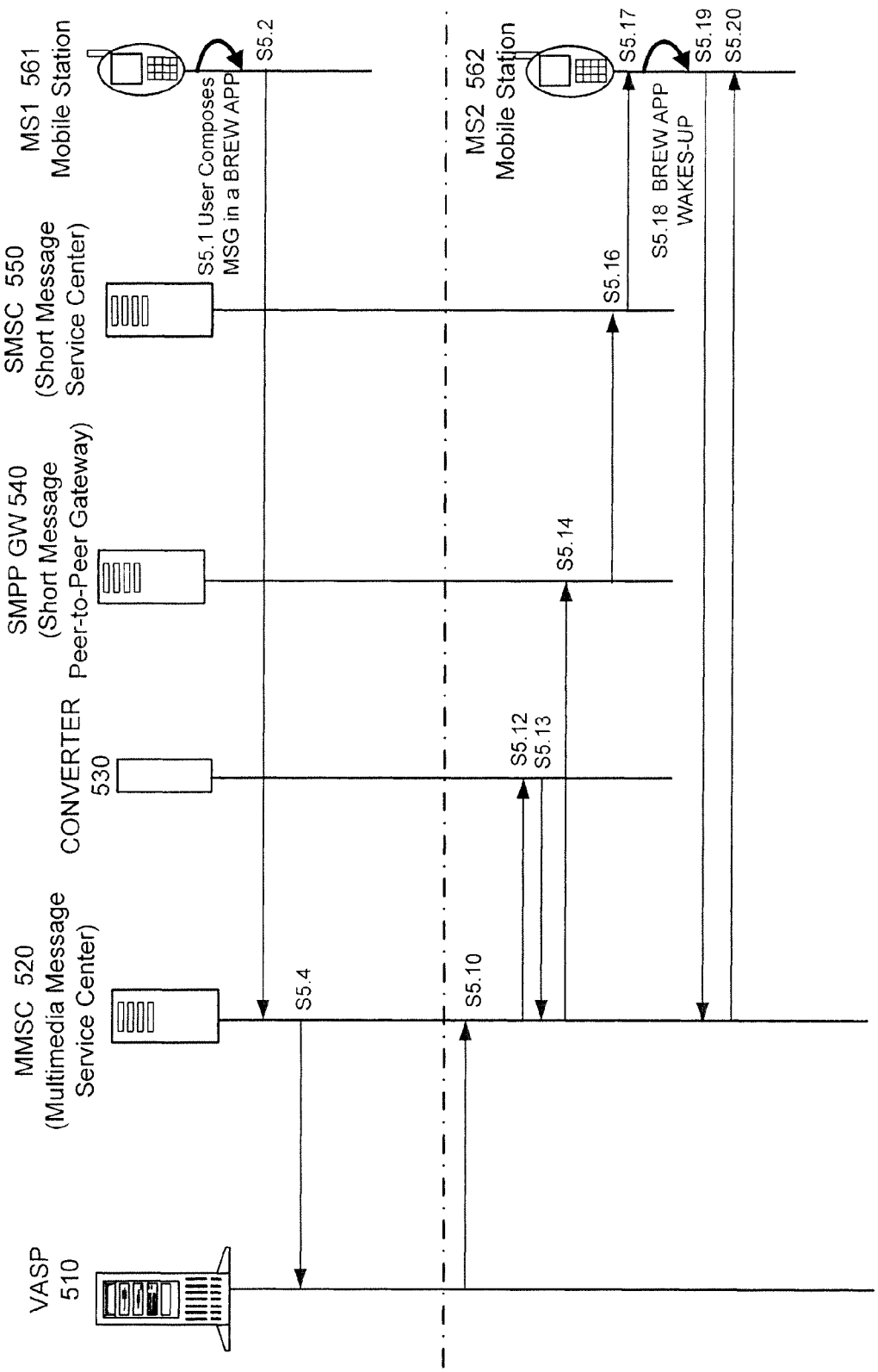

MMS BREW MESSAGE DELIVERY HYBRIDIZATION ARCHITECTURE

RELATED APPLICATIONS

This application is a Continuation of U.S. application Ser. No. 11/802,300, filed on May 22, 2007, now U.S. Pat. No. 8,068,861 the entire content of which is hereby incorporated by reference.

TECHNICAL FIELD

The present subject matter relates to techniques and equipment to allow Multimedia Message Service (MMS) communication with applications on a mobile station. Specifically, techniques and equipment are provided to allow Multimedia Message Service (MMS) communication between applications on a platform on a mobile station and third party websites or web servers by using a hybridized architectural design of MMS and BREW services. For example, the following communications are provided: communication from a BREW application on a first mobile station to a BREW application on a second mobile station, communication from a BREW application on a mobile station to an application server or website, and communication from an application server or website to a BREW application on a mobile station.

BACKGROUND

A. Growth of Mobile Communications.

In recent years, cellular or personal communication service type mobile devices have emerged as a must-have appliance among mobile professionals and consumers alike, growing in popularity every year since they were first introduced. The public has come to accept that mobile communication service enhances business and personal communications and may contribute to personal security. Consequently, mobile communication is becoming increasingly popular. Although originally designed and deployed to offer voice-grade telephone services, more recently the mobile stations and the networks that provide service through them have offered an expanding array of data communication services and other related services.

Manufacturers have developed wireless devices, such as cellular telephones, with increasing processing power, fast approaching the computing capabilities of devices such as personal computers and personal digital assistants ("PDAs"). Because of this increased processing power, mobile stations actually can be programmed to perform a wide range of application functions, for example related to tools for productivity enchantment, gaming, entertainment and the like.

B. Native Applications.

A wireless carrier typically has at least two types of applications resident on the mobile station: native applications and platform based applications. There are many applications developed by Original Equipment Manufacturers (OEMs) for the wireless carrier that run natively or directly on the mobile station hardware and operating system. For example, a Short Message Service (SMS) application (or "client") allows a user to send text messages, and a Multimedia Message Service (MMS) application (or "client") allows the user to send picture messages. These are known as "native applications."

C. Platform Based Applications.

Mobile station hardware may be proprietary, and some associated software (such as a mobile operating system) may also be proprietary. Further, the exact hardware and software may change from one mobile station to another mobile station. Thus, it is convenient to have a software platform (or interface or shell) that resides logically between, and provides a standardized interface between the mobile station hardware and mobile station operating system on one hand, and third party applications on the other hand. The software platform typically is a published standard. As a result, virtually any software developer (a third party, or a value added services provider) can write application programming for the software platform, and the application program will run properly on all mobile stations implementing the software platform. A software platform may be implemented as an "Application Program Interface" (API). Different versions of the software platform may be designed for different models of mobile stations, thus providing a standard interface for the third party application.

Qualcomm applications, for example, typically utilize the Binary Runtime Environment for Wireless ("BREW") platform or API. BREW was developed by Qualcomm, and resides between the chip system software and a third party platform application, making the mobile station functionality available to the platform application without requiring the third party developer to have the chip system source code or even a direct relationship with a device manufacturer. In this way, third party developers are able to rapidly develop a wide variety of small, transportable applications in familiar programming languages such as C and C++. For example, Verizon Wireless subscribers are able to download these third party platform applications over the Verizon Wireless network, and run them on any BREW-enabled mobile station. Alternatively, Java 2 Platform, Micro Edition (J2METM) is another runtime environment targeted to a wide range of consumer products, which some cellular telephone developers are utilizing as a standardized API.

In this written description, Verizon Wireless will be used as an exemplary wireless carrier, BREW will be used as an exemplary platform, and "Goodpictures" will be used as an exemplary, and imaginary, third party application for running on the platform.

Thus, for example, a Goodpictures application may utilize a BREW platform to operate on a mobile station subscribing to Verizon. However, one of ordinary skill in the art will be enabled to use the disclosed invention for other applications, other platforms, and other wireless carriers. Many third party applications are deployed on the mobile station as BREW clients, or platform applications. For example, Goodpictures may handle pictures on a mobile station. These are known as "BREW applications."

D. Brew Application Communications.

Today, applications running on a BREW platform send and receive multimedia messages using a direct Internet Protocol (IP) connection to a third party website or web server, much like a web browsing application. For example, if a user wants to send a picture from the mobile station to a Goodpictures website, or retrieve a picture from the Goodpictures website to the mobile station, the user must use http protocol to communicate with the Goodpictures website via the wireless carrier data network. Users of Goodpictures may be billed a monthly recurring charge or may have to purchase pre-pay for number of uses. Any interactions with the website using a browser on the phone may also be billed according to the user's billing plan airtime or data usage.

Additionally, BREW has a protocol to send application directed messages from a network server to a mobile station, and from a mobile station to a network server.

BREW application users may be subject to a monthly recurring charge or a per-use fee. However, there is no clean real time transaction based billing model for such message transactions. Thus, users may be forced to prepay for uses. For example, a BREW ringtone application requires prepayment. Additionally, the direct IP connection to a third party service has negative security implications for the carrier.

To offer product software downloading as a commercial service, the carrier or a third party vendor or the platform developer (such as Qualcomm) operates an application download server (ADS) on a packet-switched data network, which is accessible by a data call from a compatible mobile station. In general, a user having a mobile station with a platform and having subscribed to the download service initiates a data call through the network to the ADS. After log-in, the station receives and displays one or a series of menus listing available applications. The user views the list of available applications and makes a selection, which the mobile station communicates through the network to the ADS server. The server then transmits the selected application through the network to the mobile station, and the mobile station stores the new program in memory. Subsequently, the processor of the mobile station calls-up and executes the downloaded application program using the API, for example, allowing the user to play a new game on the mobile station.

Based on these platforms, a number of the carriers, vendors and third parties are now offering application downloading as an additional pay service, through the wireless networks. Mobile station users can customize their wireless telephones through the selective downloading of applications of interest, such as games, printed media, stock updates, news, or any other type of information or application that is available for download through the wireless network. The user pays for the downloaded software as well as any airtime used for the download. Many of the applications, such as games and calendar programs, are run on the mobile station off-line, without ongoing communications through the wireless network. Some of the downloaded applications, however, stock or news update routines for example, use the communication capabilities of the mobile station and the network to implement at least some ongoing application functionality.

One problem with BREW is that there is no way that messages to or from a BREW application on the mobile station can be sent through the MMS infrastructure on the wireless carrier network. Conventionally, there is no way to avoid BREW related royalties or fees to QUALCOMM for BREW application messages. This invention provides a way to send messages to or from a BREW application on the mobile station through the MMS infrastructure on the wireless carrier network.

E. Brew Application Billing Models.

There are three different (nonexclusive) billing models that are presently supported for BREW applications: a) a download fee, b) a monthly fee, and/or c) a per-use fee. For example, if a user downloads a BREW application to a mobile station, there may be a download fee, and/or a recurring monthly fee of perhaps $3 per month, and/or a per use fee of perhaps $0.25 per use. This per use fee is in addition to any other applicable communication fees that a wireless carrier may charge, such as fees for using extra minutes.

These BREW application fees may be divided in three ways: part may go to the wireless carrier, part to Qualcomm (the developer of the BREW platform), and part to the developer of the BREW client application (for example, Goodpictures as the third party developer). In practice, these fees would be paid by the user to the wireless carrier (because the wireless carrier already has an established billing relationship with the user), then the wireless carrier may forward some portion to Qualcomm, and finally Qualcomm may forward some lesser portion to Goodpictures The BREW platform and the associated BREW application download server are Qualcomm properties. Further, Qualcomm typically "owns" the BREW developer relationship, so Goodpictures is effectively a vendor for Qualcomm in this relationship. Qualcomm may "certify" the Goodpictures application as meeting BREW standards, and list the Goodpictures application in the Qualcomm application website for downloading by the mobile station subscriber or user.

At present, mobile station subscribers or users using BREW applications are sending/receiving multimedia messages using a direct IP connection to third party websites/web servers. The users are subject to a monthly recurring charge, and/or a per-use fee for each related multimedia message. However, applications that bill per-use typically have to prepay for uses (for example, BREW ringtone applications). Prepaying for per-use is inconvenient, because it takes time and effort to prepay, because it is difficult to predict (for example) how many new ringtones a user will download over the next month, and because users do not like prepaying. Thus, such there is no convenient real-time transaction based billing model for such message transactions. This lack of real-time transaction based billing is a problem.

In addition the above three billing models, this application presents additional models (fourth and fifth) which are new, and are enabled by this application.

A fourth billing model (new) for BREW applications is free (free download with free usage). In this model, a third party may develop a BREW application for Verizon Wireless, and Verizon Wireless may offer this BREW application to a mobile station user for free. The mobile station user may use this application without paying any BREW application related communication fees. However, the user will still pay any other standard communication fees that the wireless carrier may charge, such as fees for using extra minutes, or $0.25 per MMS message. Thus, the wireless carrier may find it profitable to buy and then freely distribute BREW applications that encourage wireless communications by the user, particularly MMS messages by the user. Note that the wireless carrier may not be obligated to share any of the MMS revenue with Qualcomm.

A fifth billing model (new) for BREW applications is MMS based usage billing. In this model, a wireless carrier may monitor BREW related MMS communications, and may charge additional BREW application related monthly or per user fees. These additional fees may or may not be shared with Qualcomm, depending upon the licensing agreement for the BREW platform.

The fourth and fifth billing models send and receive BREW application related MMS messages through a Mobile Message Service Center (MMSC). Thus, the MMSC is able to create billing records to support real-time transaction based billing, both for standard communication fees and for BREW related additional fees.

F. Multimedia Message Service Security

In recent years, Verizon Wireless has developed a picture messaging service called Multimedia Message Service (MMS) which is implemented using a native application or client built on the mobile station by an Original Equipment Manufacturer (OEM) for Verizon Wireless.

MMS communications from a mobile station to a third party website are relatively secure for at least three reasons. First, the mobile station does not interface directly with the third party website. Second, the Verizon Wireless MMSC is a network element that ensures the user is authorized for sending/receiving multimedia content. Third, the MMSC may interface with the third party website via a secure connection such as a VPN or a Dedicated Line, which ensures that the message is protected after it leaves the Verizon Wireless network. Additionally, MMS communications facilitate creating billing records to support real-time transaction based billing.

E. Need Exists

Hence, a need exists for MMS based communications to BREW applications for at least the following reasons: to provide secure communications between a mobile station and a third party website or web server, to support real-time transaction based billing, and to reduce or avoid communication fees (transport based royalties) paid to Qualcomm by Verizon Wireless (or by the user) for BREW application based communications.

SUMMARY

The concepts disclosed herein improve over existing art and/or alleviate one or more of the above noted problems with BREW application communications.

Exemplary techniques and equipment are disclosed that allow Multimedia Message Service (MMS) communication between applications on a mobile station and third party websites or web servers by using a hybridized architectural design of MMS and, for example, BREW.

In examples using the BREW platform or API on a mobile station, the following communications are provided: communication from a BREW application on a first mobile station to a BREW application on a second mobile station, communication from a BREW application on a mobile station to an application server or website, and communication from an application server or website to a BREW application on a mobile station.

In one example, a multimedia message from a value added service provider may be transmitted to a value added service application on a target mobile station. Specifically, a multimedia message service center (MMSC) may receive a multimedia message from a value added service provider, wherein the multimedia message comprises: target information identifying the target mobile station, and a value added service application identification; then the MMSC may convert the value added service application identification into a notification prefix; and finally the MMSC may send a short message using short message service protocols to the target mobile station, wherein the short message comprises the notification prefix and multimedia message retrieval information.

In a second example, a multimedia message from an MMSC may be transmitted to an application on a mobile station. Specifically, the mobile station may receive a short message using short message service protocols, wherein the short message comprises a notification prefix identifying the value added service application and retrieval information identifying a multimedia message; then the short message may wake up the value added service application identified by the notification prefix; and finally the mobile station may retrieve the multimedia message identified by the retrieval information.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 1 is an exemplary converter and reference architecture network for communications between a mobile station and a value added service provider (VASP).

FIG. 2 is an exemplary call flow diagram of a process for sending a multimedia message from a value added service provider (VASP) to a mobile station.

FIG. 3 is an exemplary call flow diagram of a process for sending a multimedia message from a mobile station to a value added service provider (VASP).

FIG. 4 is an exemplary call flow diagram of a process for sending a mulitimedia message from a first mobile station to a second mobile station.

FIG. 5 is stripped down exemplary call flow diagram of a process for sending a mulitimedia message from a first mobile station to a second mobile station, wherein many of the handshaking and acknowledgement signals are omitted.

DETAILED DESCRIPTION

FIG. 1 is an exemplary converter and reference architecture network for communications between a mobile station and a value added service provider (VASP).

The following exemplary hardware elements are illustrated, listed from left to right: Mobile Station 161, Access Network 182, Mobile Switching Center (MSC) 170, Home Agent (HA) 184, Packet Data Service Node (PDSN) 190, Short Message Service Center SMSC 150 and Short Message Service Gateway (SMS GW) 140, IP Network 192, Authentication Authorization Accounting (AAA) 186, Multimedia Message Service Center (MMSC) 120, Billing 188, Converter 130, Internet 194, and Value Added Service Provider (VASP) 210. Not all hardware is shown, some hardware that is shown may be omitted, and other configurations are possible.

The following exemplary communication paths and protocols are illustrated: EVDO, 1X, SS7, SMPP, FTP, and Internet. Specifically, Evolution Data Only (EVDO or EvDO) is a high speed wireless data connection. 1X refers to 1XEVDO, which is a packet switched data only wireless network which is separate from the traditional circuit switched cellular carrier network architecture. Verizon Wireless calls 1X their Internet broadband access service, and typically it produces download speeds of 400 Kbps to 500 Kbps, and upload speeds of about 80 Kbps. SS7 refers to Signaling System 7, which is a common interoffice system signaling protocol developed for telephone systems and adapted in many cellular networks. SMPP refers to Short Message Peer-to-Peer Protocol, which is a protocol that provides the capability to deliver email and voicemail between wired and wireless networks. FTP refers to File Transfer Protocol, which is a service that supports file transfer between local and remote computers, including the Internet. The Internet comprises many large computer networks joined together over high-speed backbone data links.

The Converter 130 is adapted to convert a value added service application identification into an associated notification prefix. The notification prefix is included in a short message service message to a target mobile station, and identifies the value added service application on the target mobile station. The notification prefix may use a //BREW:<CLASSID> format that uniquely identifies a 32 bit class ID on the handset. Thus, a string (e.g VASID "baseball scores") needs to be mapped to a class ID such as "0x12345678". If the notification prefix uses an SMS_PREFIX, then it may be flexible to manage two different strings that bridge the name space on the handset and on the MMSC. This identification or conversion may be preferably performed using a look up table. The Converter 130 may be associated with the MMSC 120 as shown by the dashed arrow, or the Converter 130 may be an integral part of the MMSC 120. Alternatively, the Converter 130 may be located with or be an integral part of the Billing 188. Preferably, a single "master" converter would service all of the MMSCs in order to avoid duplication. The remaining hardware is addressed below, from left to right in FIG. 1.

Mobile Station 161 is a cellular phone or personal digital assistant or other wireless communication device adapted to communicate with a wireless carrier network. Typically, a user will carry a cellular phone as he or she travels to work, to home, and to other locations.

Access Network 182 is a microwave communication tower and an associated base station, or other hardware adapted to communicate with Mobile Station 161. Alternatively, for example, satellite communications may be used to communicate with Mobile Station 161.

Mobile Switching Center (MSC) 170 may route or switch a transmission from the Mobile Station to a Short Message Service Center 150 when the user sends a short message using short message service protocols.

Home Agent (HA) 184 facilitates the mobile station communications. Specifically, roaming data services increasingly are provided via a mobile IP or "MIP" type address and routing functionality. At log-in, a home agent (HA) in the network assigns an address to the mobile station, from the home carrier's pool of addresses, for use during the duration of the session. When a mobile station has roamed across a PDSN boundary (not shown) into a new area, the mobile station will obtain packet data services via PDSN 190 in the new area. As the mobile station roams across the boundary, the mobile station must obtain a "care-of address" (COA) from a local "Foreign Agent" (FA), and the registration/validation process provides notice of this COA to the station's "Home Agent" (HA) on the home network. Although other control nodes or routers may perform these Agent functions, typically PDSNs perform these functions. During these communications, the PDSN 190 acting as a foreign agent (FA) router forwards various status and usage data to the associated AAA server 186.

Packet Data Service Node (PDSN) 190 serves as a router for mobile station communications, and also collects usage data for accounting purposes, which it relays to the AAA server 186. PDSN 190 also receives service parameters for the Mobile Station 161, operating as a mobile client, from the AAA server 186.

Short Message Service Center SMSC 150 allows short text messages to be exchanged between a mobile station and other networks.

Short Message Service Peer-to-Peer Gateway (SMPP GW) 140 allows the SMSC to communicate with other wireless carriers by using peer-to-peer protocols.

IP Network 192 is a wireless carrier data network.

Authentication Authorization Accounting server (AAA) 186 interacts with other elements, such as the HA and the PDSN, to authenticate that the mobile station subscribes to the carrier, authorize the specific service being used, and create records for accounting purposes. Specifically, AAA server 186 provides Authentication, Authorization, and Accounting (AAA) functions for packet data calls in a cdma2000-1x or EVDO type network. Such servers authorize service subscriptions, service profiles, and customized services. The AAA server 186 also performs a variety of accounting functions, including starting an accounting record, maintaining an interim accounting record, and stopping an accounting record, for each packet data communication service session.

Multimedia Message Service Center (MMSC) 120 allows multimedia messages to be exchanged between a mobile station and other networks. MMSC 120 uses SMS to notify a mobile station that a multimedia message is waiting, and then forwards the multimedia message on demand.

Billing 188 is a server that creates records, calculates, and bills transactions on the wireless network.

Converter 130 was discussed above in detail.

Internet 194 comprises many large computer networks joined together over high-speed backbone data links.

Value Added Service Provider (VASP) equipment 210 comprises one or more servers communicating through the Internet and associated with a value added service provider. For example, Goodpicture or Greatsports may be value added service providers, which may create and support BREW applications running on a BREW platform on a mobile station. A VASP may provide multiple value added service (VAS) applications. For example, Greatsports may provide a first VAS application for college basketball, and may provide a second VAS application for professional football.

The example of FIG. 1 eliminates fees and royalties that would be required, under the conventional procedures, to Qualcomm for BREW related communications. Under conventional procedures, when a user downloads a BREW application from a BREW application server, the application server creates a billing record which specifies the billing plan that the user has selected. This conventional billing plan for the BREW application may be: a monthly recurring charge (MRC), or pay per use, or no charge.

FIG. 2 is an exemplary call flow diagram for sending a multimedia message from a value added service provider (VASP) server to a BREW application on a mobile station.

Step S2.1 (HTTP Post MM7_Submit.REQ) posts a multimedia message from VASP server 210 to MMSC 220 using HyperText Transfer Protocol (HTTP) which is a protocol that supports a variety of media and file formats across a variety of platforms. This message is directed towards a BREW application on a mobile station. MM7 refers to a value added server interface as specified in 3rd Generation Partnership Product (3GPP) Multimedia Message Service (MMS) Standards. This multimedia message is accompanied by a value Added Service (VAS) Identification (ID), or VASID, associated with the VASP 210, and an identification of the target mobile station. In this example, the MMSC 220 stores the message for retrieval by the Mobile Station 260.

Step S2.2 (MM7_Submit.RES) is an acknowledgment sent from MMSC 220 to VASP server 210 that the multimedia message was received.

Step S2.3 (Request Lookup VASID→NOTIFICATION PREFIX) is a request from MMSC 220 to Converter 230 requesting a notification prefix which is associated with the value added service identification (VASID). As previously stated, the Converter 230 may be integral with the MMSC 220, in which case this lookup step would be internal to the MMSC.

Step S2.4 (Receive Lookup) is a message from Converter 230 to MMSC 220 comprising the notification prefix which is associated with the value added service identification (VASID).

Step S2.5 (DATA_SM: M-NOTIFICATION-IND //BREW:<ClassID>:<Msg Retrieval URI> or //SMS-PREFIX:<Msg Retrieval URI>) is a notification from MMSC 220 to SMPP GW 240 comprising a notification prefix and a message retrieval Uniform Resource Indicator (URI). The notification prefix is associated with a Value Added Service (VAS) BREW application, as discussed above regarding the Converter 230 lookup table. The notification prefix may be a BREW Class Identification or may be a Short Message Service (SMS) prefix.

The message retrieval Uniform Resource Indicator (URI) indicates the multimedia message which is temporarily stored in the MMSC 220. The URI is generated by the MMSC 220.

Thus, the message of step S2.5 performs two purposes. First, this message identifies the VAS BREW Application on the Mobile Station 260 which is targeted. Second, this message passes the URI which identifies the multimedia message stored in the MMSC 220.

Step S2.6 (DATA_SM_RESP) is an acknowledgment from the SMPP GW 240 to MMSC 220 that the notification of step S2.5 has been successfully received.

Step S2.7 (M_Notification.IND) is a notification from SMPP GW 240 to SMSC 250, forwarding the notification of step S2.5.

Step S2.8 (M_Notification.IND) is a notification from SMSC 250 to Mobile Station 260, forwarding the notification of step S2.5 and step S2.7.

Step S2.9 (BREW APP WAKES-UP) wakes up the BREW application on the Mobile Station 260 identified by the notification prefix in response to receipt of the SMS notification message from the SMSC 250. One or more BREW applications reside in the Mobile station 260. The notification prefix may be a BREW Class Identification or may be a Short Message Service (SMS) prefix.

When the notification prefix uses a //BREW:<classid> format, BREW directs the message to an application that is registered with BREW using the specified Class ID. All BREW applications are required to have unique 32 bit Class IDs. When the notification prefix uses the //SMS_PREFIX format, BREW directs the message to all applications that have registered for SMS messages with the specified prefix. The Class ID and the SMS_PREFIX are specified by applications using the BREW MIF (Module Interface Format) file. Once the application gets the notification message, the application can parse the message and initialize appropriate data components to make a network connection and to retrieve and store the message.

The existing mobile phone operating system will support the above notification prefix formats and procedures.

Step S2.10 (HTTP GET: <MSG RETRIEVAL URI>) is a retrieval request from the Mobile Station 260 to MMSC 220 to retrieve the multimedia message identified by the URI.

Step S2.11 (GET RESP M-Retrieve.CONF) sends the identified multimedia message from the MMSC 220 to Mobile Station 260. The Mobile Station 260 associates the multimedia message with the BREW application identified by the notification prefix.

Step S2.12 (POST: M-Acknowledge.IND) is an acknowledgement from Mobile Station 260 to MMSC 220 that the multimedia message has been received by the Mobile Station.

Step S2.13 (POST MM7_Delivery_Report.REQ) is an report from MMSC 220 to VASP server 210 that the multimedia message has been delivered to the Mobile Station 260.

Step S2.14 (POST RESP MM7_Delivery_Report.RES) is an acknowledgement from VASP 210 to MMSC 220 that the report of step S2.13 has been received by VASP server 210.

Thus, a multimedia message has been successfully transmitted from VASP server 210 to a specific BREW Application on Mobile Station 260 by using modified MMS protocols.

Note that a simple text message to a BREW application on a mobile station may be sent as a multimedia message by using the above steps.

Alternatively, simple text messages may similarly be sent to a BREW application by associating a converter with an SMSC, and performing a lookup at the SMSC. In this alternative, the SMSC would perform the lookup functions previously performed at the MMSC.

FIG. 3 is an exemplary call flow diagram for sending a multimedia message from a mobile station to a value added service provider (VASP) server. The hardware in FIG. 3 is identical to the hardware discussed above in FIG. 2, and many of the calls are very similar. However, note that Converter 330 is not used in the call flows of FIG. 3.

Step S3.1 (User Composes MSG in a BREW APP) indicates that the user of Mobile Station 260 uses a BREW application to create a multimedia message. For example, the user may take a picture using a camera built into Mobile Station 260, and the user may wish to post the picture on a website associated with a Goodpictures™ application running on the BREW platform on Mobile Station 260.

Step S3.2 (POST M_Send.REQ) is a multimedia message sent from Mobile Station 360 to MMSC 320.

Step S3.3 (POST M_Send.CONF) is a confirmation from MMSC 320 to Mobile Station 360 that the multimedia message was received.

Step S3.4 (POST MM7_Deliver.REQ) sends the multimedia message from MMSC 320 to VASP 310.

Step S3.5 (POST MM7_Deliver.RES) is an acknowledgment from VASP server 310 to MMSC 320 that the multimedia message was successfully received by VASP 310.

Step S3.6 (DATA_SM: M_DELIVERY.IND) is an acknowledgement from MMSC 320 to SMPP GW 340 that the multimedia message was successfully received by VASP 310.

Step S3.7 (DATA_SM_RESP) is a response from SMPP GW 340 that the acknowledgement of step S3.6 was received by SMPP GW 340.

Step S3.8 (M_DELIVERY.IND) is a message from SMPP GW 340 to SMSC 350 that the multimedia message was successfully received by VASP server 310.

Step S3.9 (M_DELIVERY.IND) is a message from SMSC 350 to Mobile Sttion 360 that the multimedia message was successfully received by VASP server 310. Thus, Mobile Station 360 is satisfied that the multimedia message was successfully received by VASP server 310.

FIG. 4 is an exemplary call flow diagram for sending a mulitimedia message from a first mobile station to a second mobile station. Specifically, a multimedia message is sent from a BREW application on Mobile Station 461, via VASP server 410, to a BREW application on Mobile Station 462.

The top half (above the horizontal dashed line) of FIG. 4 is equivalent to FIG. 3, and illustrates a multimedia message from Mobile Station 461 to VASP server 410. Call flows S4.1 to S4.9 in FIG. 4 are respectively identical to call flows 3.1 to 3.9 in FIG. 3, as discussed above.

The bottom half (below the horizontal dashed line) of FIG. 4 is equivalent to FIG. 2 and illustrates a multimedia message from VASP 410 to Mobile Station 462. Call flows S4.10 to S4.23 in FIG. 4 are respectively identical to call flows S2.1 to S2.14 in FIG. 2, as discussed above.

For example, a first user may take a picture using Mobile Station 461, and then may use a Goodpictures application running on the BREW platform on Mobile Station 461 to compose a multimedia message for a second user, and then may send the multimedia message to the second user via a Goodpictures VASP server. The second user may receive the multimedia message at a Goodpictures application on Mobile Station 462.

FIG. 5 is stripped down exemplary call flow diagram for sending a mulitimedia message from a first mobile station to a second mobile station, wherein many of the handshaking and acknowledgement calls that were shown in FIG. 4 are omitted from FIG. 5.

Specifically, steps S5.1, S5.2, S5.4, S5.10, S5.12, S5.13, S5.14, S5.16, S5.17, S5.18, S5.19, and S5.20 are respectively equivalent to steps S3.1, S3.2, S3.4 in FIG. 3 and S2.1, S2.3, S2.4, S2.5, S2.7, S2.8, S2.9, S2.10, S2.11 in FIG. 2.

As used herein, terms such as computer or machine "readable medium" refer to any medium that participates in providing instructions and/or data to a processor. Such a medium may take many forms, including but not limited to, non-volatile media, volatile media, and transmission media. Non-volatile media include, for example, optical or magnetic disks, such as flash memory of the mobile station as well as storage devices in any server or computer(s), switches or routers that may be used to store programming for downloading into mobile stations. Volatile media include dynamic memory, such as RAM in the mobile station or main memory of a computer platform of a mobile PC or of a program server. Physical transmission media include coaxial cables; copper wire and fiber optics, including the wires that comprise a bus within a computer system/server. Carrier-wave transmission media can take the form of electric or electromagnetic signals, or light waves, such as those generated during radio frequency (RF) and infrared (IR) data communications over wireline and wireless links of the network. Many of these forms of computer readable media may be involved in carrying one or more sequences of one or more instructions to a processor for storage and/or execution.

Hardware may be adapted to perform the above steps by incorporating computer readable-medium with instructions stored thereon into the hardware.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method for transmitting a message from a value added service provider to a platform based application program resident on a target mobile station,
    wherein the target mobile station executes a software platform program for providing a standard interface for third party application programs with hardware and a resident operating system of the target mobile station, and
    wherein the platform based application program is a third party application program written to the standard of the software platform program,
    the method comprising steps of:
    a) receiving a message from the value added service provider, for multimedia message service (MMS) delivery, at a multimedia message service center (MMSC) of a mobile communication network, the received message comprising: content for processing by the platform based application program, target information identifying the target mobile station, and an application identification of the platform based application program;
    b) using the application identification to lookup a notification prefix in a table in a converter associated or integral with the MMSC so as to convert the application identification of the platform based application program into the notification prefix;
    c) sending a notification message through the mobile communication network to the target mobile station, the notification message containing the notification prefix and MMS message retrieval information; and
    d) responsive to a request from the mobile station containing at least some of the MMS message retrieval information, sending a MMS message including the content for processing by the platform based application, through the mobile communication network to the target mobile station using an MMS protocol.

2. The method of claim 1, wherein:
    the software platform program is Binary Runtime Environment for Wireless (BREW); and
    the notification prefix comprises a Binary Runtime Environment for Wireless (BREW) class identification.

3. The method of claim 2, wherein the Binary Runtime Environment for Wireless (BREW) class identification is formatted as follows, //BREW:<CLASSID>.

4. The method of claim 1, wherein the notification prefix comprises a generic string that the value added service application is pre-registered to handle.

5. The method of claim 4, wherein the generic string is formatted as follows, //SMS_PREFIX.

6. A system, comprising a multimedia message service center (MMSC), for transmitting a multimedia message from a value added service provider to a platform based application program on a target mobile station,
    wherein the target mobile station executes a software platform program for providing a standard interface for third party application programs with hardware and a resident operating system of the target mobile station,
    wherein the platform based application program is a third party application program written to the standard of the software platform program, and
    wherein the system is configured to perform functions, including functions to:
    a) receive a message from the value added service provider, for multimedia message service (MMS) delivery, at the MMSC, the received message comprising: content for processing by the platform based application program, target information identifying the target mobile station, and an application identification of the platform based application program;
    b) using the application identification to lookup a notification prefix in a table in a converter associated or integral with the MMSC so as to convert the application identification of the platform based application program into the notification prefix;
    c) send a notification message through the mobile communication network to the target mobile station, the notification message containing the notification prefix based on the application identification and MMS message retrieval information; and
    d) responsive to a request from the mobile station containing at least some of the MMS message retrieval information, send a MMS message including the content for processing by the platform based application, through the mobile communication network to the target mobile station using an MMS protocol.

7. The system of claim 6, wherein:
    the software platform program is Binary Runtime Environment for Wireless (BREW), and
    the notification prefix comprises a Binary Runtime Environment for Wireless (BREW) class identification.

8. The system of claim 7, wherein the Binary Runtime Environment for Wireless (BREW) class identification is formatted as follows, //BREW:<CLASSID>.

9. The system of claim 6, wherein the notification prefix comprises a generic string that the value added service application is pre-registered to handle.

10. The system of claim 9, wherein the generic string is formatted as follows, //SMS_PREFIX.

* * * * *